US008730396B2

(12) United States Patent
Kumaraswamy et al.

(10) Patent No.: US 8,730,396 B2
(45) Date of Patent: May 20, 2014

(54) CAPTURING EVENTS OF INTEREST BY SPATIO-TEMPORAL VIDEO ANALYSIS

(75) Inventors: Suresh Kirthi Kumaraswamy, Bangalore (IN); Puneeth Bilagunda Chandrashekar, Bangalore (IN); Hemanth Kumar Sangappa, Bangalore (IN); Venu Belagur Krishnamurthy, Devanur (IN)

(73) Assignee: Mindtree Limited, Bangalore, Karnataka (IN)

( * ) Notice: Subject to any disclaimer, the term of this patent is extended or adjusted under 35 U.S.C. 154(b) by 620 days.

(21) Appl. No.: 12/876,166

(22) Filed: Sep. 6, 2010

(65) Prior Publication Data

US 2011/0317009 A1 Dec. 29, 2011

(30) Foreign Application Priority Data

Jun. 23, 2010 (IN) ............................ 1753/CHE/2010

(51) Int. Cl.
*H04N 5/213* (2006.01)
(52) U.S. Cl.
USPC ............................ 348/575; 382/224; 348/607
(58) Field of Classification Search
USPC ........................................................ 348/143
See application file for complete search history.

(56) References Cited

U.S. PATENT DOCUMENTS

| | | | | |
|---|---|---|---|---|
| 5,784,023 A * | 7/1998 | Bluege | ............................ | 342/104 |
| 6,335,985 B1 * | 1/2002 | Sambonsugi et al. | ........ | 382/190 |
| 6,529,132 B2 * | 3/2003 | Boucourt | ....................... | 340/583 |
| 6,856,696 B1 * | 2/2005 | Ajioka | ............................ | 382/173 |
| 7,180,529 B2 * | 2/2007 | Covannon et al. | ............ | 345/690 |
| 7,203,693 B2 * | 4/2007 | Carlbom et al. | ....................... | 1/1 |
| 7,304,649 B2 * | 12/2007 | Hori et al. | ....................... | 345/619 |
| 7,347,555 B2 * | 3/2008 | Grover | ............................... | 353/7 |
| 7,356,164 B2 * | 4/2008 | Aliaga et al. | .................. | 382/103 |
| 7,429,997 B2 * | 9/2008 | Givon | ............................... | 348/46 |

(Continued)

FOREIGN PATENT DOCUMENTS

EP 1845477 A2 10/2007

OTHER PUBLICATIONS

K. Toyama, J. Krumm, B. Brumitt, and B. Meyers, "Wallflower: Principles and Practice of Background Maintenance," in International Conference on Computer Vision, Sep. 1999.

(Continued)

*Primary Examiner* — Sath V Perungavoor
*Assistant Examiner* — Kehinde O Abimbola
(74) *Attorney, Agent, or Firm* — Ash Tankha; Lipton, Weinberger & Husick

(57) ABSTRACT

A computer implemented method and system for capturing events of interest by performing a spatio-temporal analysis of a video are provided. A continuous video stream containing a series of image frames is acquired over time. Each of the image frames is represented by horizontal spatial coordinates and vertical spatial coordinates of a two dimensional plane. A temporal dimension is assigned across the image frames of the video stream. A spatio-temporal analysis image is constructed based on a user-defined line of analysis on each of one or more of the image frames. The spatio-temporal analysis image is constructed by concatenating a series of temporally-successive linear pixel arrays along the temporal dimension. Each of the linear pixel arrays comprises an array of pixels along the line of analysis defined on each of one or more of the image frames. The constructed spatio-temporal analysis image is segmented for capturing the events of interest.

20 Claims, 14 Drawing Sheets

(56) References Cited

U.S. PATENT DOCUMENTS

| | | | |
|---|---|---|---|
| 7,450,165 B2* | 11/2008 | Ahiska | 348/240.2 |
| 7,519,907 B2 | 4/2009 | Cohen et al. | |
| 7,528,881 B2* | 5/2009 | Ahiska | 348/335 |
| 7,545,516 B2* | 6/2009 | Jia et al. | 356/603 |
| 7,856,137 B2* | 12/2010 | Yonezawa et al. | 382/136 |
| 7,872,665 B2* | 1/2011 | Grover | 348/47 |
| 7,876,325 B1* | 1/2011 | Sharma | 345/473 |
| 7,949,295 B2* | 5/2011 | Kumar et al. | 434/307 R |
| 7,949,474 B2* | 5/2011 | Callahan et al. | 702/19 |
| 7,957,565 B1* | 6/2011 | Sharma et al. | 382/115 |
| 7,962,283 B2* | 6/2011 | Zhang et al. | 701/523 |
| 7,991,837 B1* | 8/2011 | Tahan | 709/203 |
| 7,995,078 B2* | 8/2011 | Baar | 345/660 |
| 8,009,863 B1* | 8/2011 | Sharma et al. | 382/100 |
| 8,107,699 B2* | 1/2012 | Hong et al. | 382/128 |
| 8,145,007 B2* | 3/2012 | Davey et al. | 382/274 |
| 8,254,679 B2* | 8/2012 | Marchesotti | 382/173 |
| 8,274,552 B2* | 9/2012 | Dahi et al. | 348/47 |
| 8,275,175 B2* | 9/2012 | Baltatu et al. | 382/118 |
| 8,280,136 B2* | 10/2012 | Gotardo et al. | 382/131 |
| 8,306,265 B2* | 11/2012 | Fry et al. | 382/103 |
| 8,311,915 B2* | 11/2012 | Baar et al. | 705/35 |
| 2001/0012379 A1* | 8/2001 | Amemiya et al. | 382/103 |
| 2002/0008785 A1* | 1/2002 | Yamaguchi et al. | 348/699 |
| 2002/0009719 A1* | 1/2002 | Walt et al. | 435/6 |
| 2002/0027616 A1* | 3/2002 | Jun et al. | 348/578 |
| 2002/0028003 A1* | 3/2002 | Krebs et al. | 382/115 |
| 2002/0037103 A1* | 3/2002 | Hong et al. | 382/173 |
| 2002/0039387 A1* | 4/2002 | Auvray et al. | 375/240.18 |
| 2002/0094135 A1* | 7/2002 | Caspi et al. | 382/294 |
| 2002/0110195 A1* | 8/2002 | Auvray et al. | 375/240.18 |
| 2002/0142477 A1* | 10/2002 | Lewis et al. | 436/151 |
| 2002/0159536 A1* | 10/2002 | Gelblum et al. | 375/265 |
| 2002/0164084 A1* | 11/2002 | Baggs | 382/275 |
| 2003/0028005 A1* | 2/2003 | Bazan | 536/23.5 |
| 2003/0088532 A1* | 5/2003 | Hampshire, II | 706/16 |
| 2003/0108873 A1* | 6/2003 | Dahlberg et al. | 435/6 |
| 2003/0185420 A1* | 10/2003 | Sefcik et al. | 382/103 |
| 2004/0014143 A1* | 1/2004 | Haskins et al. | 435/7.1 |
| 2004/0093166 A1* | 5/2004 | Kil | 702/19 |
| 2004/0115683 A1* | 6/2004 | Medford et al. | 435/6 |
| 2004/0190092 A1* | 9/2004 | Silverbrook et al. | 358/539 |
| 2004/0194129 A1* | 9/2004 | Carlbom et al. | 725/32 |
| 2004/0233987 A1* | 11/2004 | Porikli et al. | 375/240.16 |
| 2004/0249848 A1* | 12/2004 | Carlbom et al. | 707/102 |
| 2005/0002572 A1* | 1/2005 | Saptharishi et al. | 382/224 |
| 2005/0042230 A1* | 2/2005 | Anderson et al. | 424/186.1 |
| 2005/0048527 A1* | 3/2005 | Allawi et al. | 435/6 |
| 2005/0104958 A1* | 5/2005 | Egnal et al. | 348/143 |
| 2005/0134685 A1* | 6/2005 | Egnal et al. | 348/157 |
| 2005/0165789 A1* | 7/2005 | Minton et al. | 707/10 |
| 2005/0166163 A1* | 7/2005 | Chang et al. | 715/863 |
| 2005/0203927 A1* | 9/2005 | Sull et al. | 707/100 |
| 2005/0226502 A1* | 10/2005 | Cohen et al. | 382/173 |
| 2006/0045346 A1* | 3/2006 | Zhou | 382/190 |
| 2006/0050958 A1* | 3/2006 | Okada et al. | 382/173 |
| 2006/0056056 A1* | 3/2006 | Ahiska et al. | 359/690 |
| 2006/0101060 A1* | 5/2006 | Li et al. | 707/102 |
| 2006/0176209 A1* | 8/2006 | Shu et al. | 342/25 R |
| 2006/0221181 A1* | 10/2006 | Garoutte | 348/143 |
| 2006/0222206 A1* | 10/2006 | Garoutte | 382/103 |
| 2006/0262184 A1* | 11/2006 | Peleg et al. | 348/36 |
| 2006/0282236 A1* | 12/2006 | Wistmuller | 703/2 |
| 2006/0291695 A1* | 12/2006 | Lipton et al. | 382/103 |
| 2007/0052803 A1* | 3/2007 | Chosak et al. | 348/143 |
| 2007/0058717 A1* | 3/2007 | Chosak et al. | 375/240.08 |
| 2007/0116347 A1* | 5/2007 | Hong | 382/131 |
| 2007/0160274 A1* | 7/2007 | Mashiach | 382/128 |
| 2007/0165936 A1* | 7/2007 | Yonezawa et al. | 382/136 |
| 2007/0230781 A1* | 10/2007 | Yamamoto | 382/173 |
| 2007/0231791 A1* | 10/2007 | Olsen et al. | 435/6 |
| 2007/0263915 A1* | 11/2007 | Mashiach | 382/130 |
| 2007/0269078 A1* | 11/2007 | Lee | 382/103 |
| 2008/0031521 A1* | 2/2008 | Can et al. | 382/173 |
| 2008/0131920 A1* | 6/2008 | Levin | 435/29 |
| 2008/0152192 A1* | 6/2008 | Zhu et al. | 382/103 |
| 2008/0195284 A1* | 8/2008 | Hammadou | 701/45 |
| 2008/0201101 A1* | 8/2008 | Hebert et al. | 702/152 |
| 2008/0233595 A1* | 9/2008 | Nie et al. | 435/7.1 |
| 2008/0298674 A1* | 12/2008 | Baker et al. | 382/154 |
| 2008/0320403 A1* | 12/2008 | Glaberson | 715/763 |
| 2009/0024547 A1* | 1/2009 | Lu et al. | 706/21 |
| 2009/0040301 A1* | 2/2009 | Sandler et al. | 348/143 |
| 2009/0041328 A1* | 2/2009 | Hong et al. | 382/132 |
| 2009/0073265 A1* | 3/2009 | Greenhill et al. | 348/148 |
| 2009/0185078 A1* | 7/2009 | Van Beek et al. | 348/624 |
| 2009/0209858 A1* | 8/2009 | Oelze | 600/443 |
| 2009/0232353 A1* | 9/2009 | Sundaresan et al. | 382/103 |
| 2009/0285469 A1* | 11/2009 | Callahan et al. | 382/133 |
| 2009/0310444 A1* | 12/2009 | Hiroe | 367/125 |
| 2009/0310883 A1* | 12/2009 | Moriya | 382/274 |
| 2009/0316990 A1* | 12/2009 | Nakamura et al. | 382/173 |
| 2010/0021009 A1* | 1/2010 | Yao | 382/103 |
| 2010/0021378 A1* | 1/2010 | Rousso et al. | 424/1.11 |
| 2010/0033574 A1* | 2/2010 | Ran et al. | 348/159 |
| 2010/0046799 A1* | 2/2010 | Saptharishi et al. | 382/103 |
| 2010/0070483 A1* | 3/2010 | Delgo et al. | 707/706 |
| 2010/0070523 A1* | 3/2010 | Delgo et al. | 707/769 |
| 2010/0092085 A1* | 4/2010 | Marchesotti | 382/173 |
| 2010/0097526 A1* | 4/2010 | Jacob | 348/578 |
| 2010/0098289 A1* | 4/2010 | Tognoli et al. | 382/100 |
| 2010/0100001 A1* | 4/2010 | Aguilar et al. | 600/544 |
| 2010/0104135 A1* | 4/2010 | Nakajima | 382/103 |
| 2010/0111374 A1* | 5/2010 | Stoica | 382/115 |
| 2010/0202662 A1* | 8/2010 | Chung | 382/104 |
| 2010/0245157 A1* | 9/2010 | Wicks et al. | 342/162 |
| 2010/0245582 A1* | 9/2010 | Harel | 348/159 |
| 2010/0245583 A1* | 9/2010 | Harel | 348/159 |
| 2010/0245670 A1* | 9/2010 | Takeda et al. | 348/607 |
| 2010/0262374 A1* | 10/2010 | Hwang et al. | 702/19 |
| 2011/0002517 A1* | 1/2011 | Mollus et al. | 382/130 |
| 2011/0065072 A1* | 3/2011 | Duffy | 434/167 |
| 2011/0142335 A1* | 6/2011 | Ghanem et al. | 382/165 |
| 2011/0157355 A1* | 6/2011 | Ivanov et al. | 348/143 |
| 2011/0317009 A1* | 12/2011 | Kumaraswamy et al. | 348/143 |
| 2012/0002047 A1* | 1/2012 | An et al. | 348/143 |
| 2012/0038776 A1* | 2/2012 | Ahiska et al. | 348/159 |
| 2012/0092494 A1* | 4/2012 | Garoutte et al. | 348/143 |
| 2012/0114245 A1* | 5/2012 | Lakshmanan et al. | 382/186 |
| 2012/0128254 A1* | 5/2012 | Nakajima | 382/190 |
| 2012/0206606 A1* | 8/2012 | Marchese | 348/159 |

OTHER PUBLICATIONS

C. Wren, A. Azarbayejani, T. Darrell, and A. Pentland, "Pfinder: Real-Time Tracking of the Human Body," IEEE Transactions on Pattern Analysis and Machine Intelligence, vol. 19, No. 7, pp. 780-785, Jul. 1997.

Niyogi, S.A., Adelson, E.H., "Analyzing and Recognizing Walking Figures in XYT", CVPR94(469-474), CVPR 1994 IEEE Computer Society Conference Date: Jun. 21-23, 1994.

Aissa Saoudi, Hassane Essafi ,"Spatio-Temporal Video Slice Edges Analysis for Shot Transition Detection and Classification", Waset, vol. 4 No. 3 Summer 2008.

\* cited by examiner

CAPTURING EVENTS OF INTEREST BY SPATIO-TEMPORAL VIDEO ANALYSIS

CROSS REFERENCE TO RELATED APPLICATIONS

This application claims the benefit of non-provisional patent application number 1753/CHE/2010 titled "Capturing Events Of Interest By Spatio-temporal Video Analysis", filed on Jun. 23, 2010 in the Indian Patent Office.

The specification of the above referenced patent application is incorporated herein by reference in its entirety.

BACKGROUND

Video content analysis (VCA) refers to processing of video for determining events of interest and activity in a video, such as, a count of people or vehicles passing through a zone, the direction and speed of their movement, breach of boundary, speeding vehicles, etc. using computer vision techniques. VCA finds numerous applications in video surveillance, customer behavior in super markets, vehicular traffic analysis, and other areas. VCA is becoming a necessity given the extent of breach of security, requirement for surveillance, and threats to or potential compromise of human life and property in cities, defense establishments and at industrial and commercial premises.

Existing VCA algorithms process an entire image or a patch of the image using pure spatial image processing of the video. Hence, these algorithms are inherently suboptimal with respect to their computational efficiency and memory utilization. For example, processing visual graphics array (VGA) image frames of 640×480 pixels each in pure spatial domain requires segmentation of the entire 307200 pixels of each image frame, which is highly memory intensive.

Hence, there is a long felt but unresolved need for a computer implemented method and system for capturing events of interest by performing spatio-temporal analysis of a video using user-defined lines of analysis.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

The computer implemented method and system disclosed herein addresses the above stated need for capturing events of interest by optimally performing spatio-temporal analysis of a video using one or more user-defined lines of analysis. A continuous video stream containing a series of image frames is acquired over time. Each of the image frames is represented by horizontal spatial coordinates and vertical spatial coordinates of a two dimensional (2D) plane. A temporal dimension is assigned across the image frames of the video stream. The temporal dimension represents the order of the image frames using predefined temporal coordinates. A spatio-temporal analysis image is constructed based on a user-defined line of analysis on each of one or more of the image frames. The spatio-temporal analysis image is constructed by concatenating a series of temporally-successive linear pixel arrays along the temporal dimension. Each of the linear pixel arrays comprises an array of pixels selected along the line of analysis defined on each of one or more of the image frames. For example, the spatio-temporal analysis image is constructed by concatenating linear pixel arrays from every Nth successive image frame in the series of image frames. The width of each of the linear pixel arrays is substantially identical to the width of the line of analysis. The line of analysis is, for example, at least a single pixel wide. The constructed spatio-temporal analysis image is segmented for capturing the events of interest. The constructed spatio-temporal analysis image provides a summary of events occurring over the image frames at the line of analysis for the duration of the video or the duration of the concatenation of the series of temporally-successive linear pixel arrays. A user can define one or more lines of analysis for parallely constructing multiple spatio-temporal analysis images that are related in time.

The capture of the events of interest at the line of analysis comprises, for example, detecting presence of an object, detecting traversal of an object, determining speed of the traversal of the object, determining an object count based on the traversal of one or more objects, and determining duration of the presence of the object.

A user defines the line of analysis, having any orientation in the 2D plane, on one or more of the image frames. The user-inputted line of analysis on one of the image frames is used to automatically accumulate the linear pixel arrays from the remaining successive image frames by replicating the same coordinates of the line of analysis over these image frames. Accordingly, the line of analysis is defined by the horizontal spatial coordinates, or the vertical spatial coordinates, or by a combination of the horizontal spatial coordinates and the vertical spatial coordinates in each of the image frames. The constructed spatio-temporal analysis image is represented by a fixed spatial coordinate, a range of variable spatial coordinates, and variable temporal coordinates. For example, the constructed spatio-temporal analysis image is represented by a combination of a fixed horizontal spatial coordinate, a range of the vertical spatial coordinates and variable temporal coordinates, or a combination of a fixed vertical spatial coordinate, a range of the horizontal spatial coordinates and variable temporal coordinates.

The segmentation of the constructed spatio-temporal analysis image comprises foreground segmentation for detecting objects and the events of interest. A background of the constructed spatio-temporal analysis image is modeled, for example, by determining a moving average of the linear pixel arrays along the temporal dimension. The modeled background is subtracted from the constructed spatio-temporal analysis image for obtaining the foreground of the constructed spatio-temporal analysis image. Segmentation of the obtained foreground is then performed for detecting the objects and the events of interest.

Different events of interest are captured using the spatio-temporal analysis image based on the actual events occurring in the actual scenario being captured. One of the captured events is the speed of traversal of the object, for example, a moving vehicle. The speed of traversal of the object is determined by receiving one or more lines of analysis spaced apart from each other by a separation distance on the image frames from a user. The separation distance is based on an actual distance in the actual scene being captured. One or more spatio-temporal analysis images are constructed based on the lines of analysis. The presence and the times of presence of the object on the constructed spatio-temporal analysis images are determined using foreground segmentation. The speed of traversal of the object is determined based on the separation distance, frame rate of the video, and difference between times of presence of the object on the constructed spatio-temporal analysis images.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1:
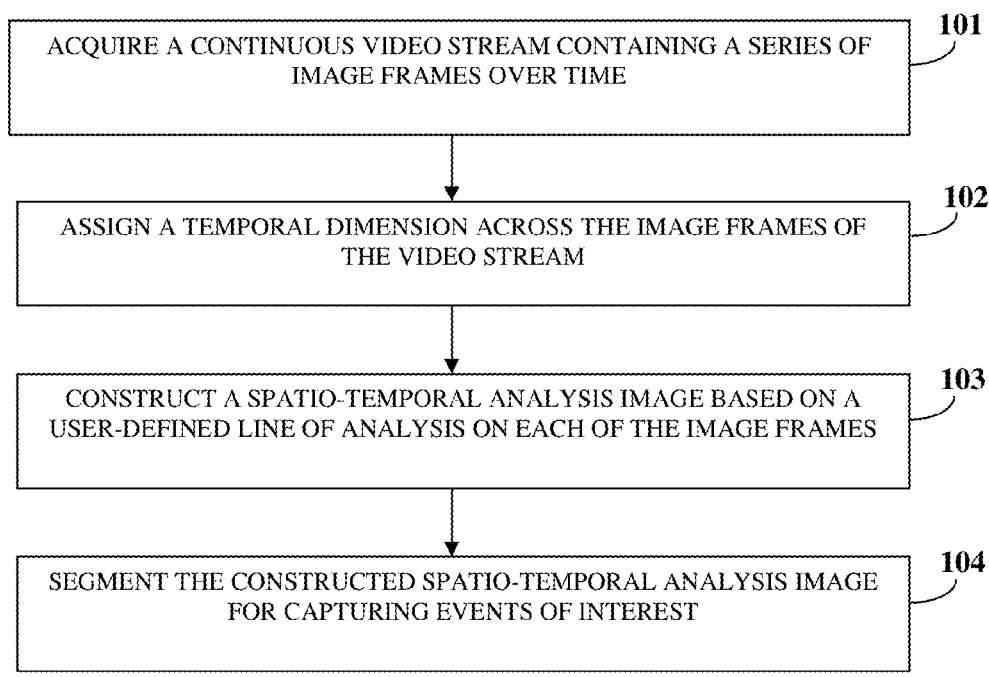
FIG. 1 illustrates a computer implemented method for capturing events of interest by performing spatio-temporal analysis of a video.

FIG. 1 illustrates a computer implemented method for capturing events of interest by performing spatio-temporal analysis of a video. A continuous video stream containing a series of image frames is acquired 101 over time. Each of the image frames is represented by horizontal spatial coordinates (X) and vertical spatial coordinates (Y) of a two dimensional (2D) plane. A temporal dimension (T) is assigned 102 across the image frames of the video stream. The temporal dimension (T) represents the order of the image frames using predefined temporal coordinates. A spatio-temporal analysis image is constructed 103 based on a user-defined line of analysis on each of one or more of the image frames. As used herein, the term "line of analysis" refers to a selection of a linear array of pixels in each moving image frame. The linear array of pixels in every line of analysis is sequentially accumulated over time in order to analyze and summarize events that are exposed only to the accumulated linear arrays of pixels. The width of each of the linear pixel arrays is substantially identical to the width of the line of analysis. The line of analysis is, for example, at least a single pixel wide. The spatio-temporal analysis image is constructed by concatenating a series of temporally-successive linear pixel arrays along the temporal dimension. Each of the linear pixel arrays comprises an array of pixels selected along the line of analysis defined on each of one or more of the image frames. For example, the spatio-temporal analysis image is constructed by concatenating linear pixel arrays from every Nth successive image frame in the series of image frames. The constructed spatio-temporal analysis image is segmented 104 for capturing the events of interest. The constructed spatio-temporal analysis image provides a summary of events occurring over the image frames at the line of analysis for the duration of the video or the duration of the concatenation of the series of temporally-successive linear pixel arrays. A user can define one or more lines of analysis for parallel construction of multiple spatio-temporal analysis images that are related in time.

The capture of events of interest at the line of analysis comprises, for example, detecting presence of an object, detecting traversal of the object, determining speed of the traversal of the object, determining an object count based on the traversal of one or more objects, determining duration of presence of the object, etc.

The user defines the line of analysis, having any in-plane orientation with respect to the two dimensional (2D) plane, on one or more of the image frames. The user-inputted line of analysis on one of the image frames is used to automatically accumulate the linear pixel arrays from the remaining successive image frames by replicating the same coordinates of the line of analysis over these image frames. Accordingly, the line of analysis is defined by the horizontal spatial coordinates or the vertical spatial coordinates, or by a combination of the horizontal spatial coordinates and the vertical spatial coordinates in one or more of the image frames. The constructed spatio-temporal analysis image is represented by a fixed spatial coordinate, a definite range of variable spatial coordinates and variable temporal coordinates. For example, the constructed spatio-temporal analysis image is represented by a combination of a fixed horizontal spatial coordinate, a range of vertical spatial coordinates and variable temporal coordinates, or a combination of a fixed vertical spatial coordinate, a range of horizontal spatial coordinates and variable temporal coordinates.

Figure 2A:
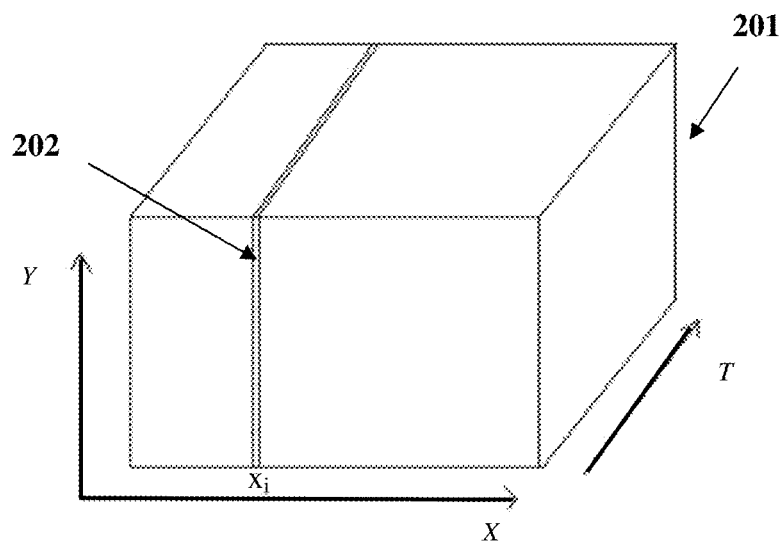
FIG. 2A exemplarily illustrates a representation of a cube of image frames over time.

A normal static 2D image frame can be expressed as lines arranged horizontally or vertically such that each line is obtained from pixels $P_{ij}$ at j=n for all values of i or i=m for all values of j to a maximum number of rows or columns. The static 2D image frame comprises pure spatial data in XY coordinates. Similarly, a video stream comprising 2D static image frames stacked in time (T) is visualized as a cube 201 of image frames, wherein the third dimension or the transverse dimension is time (T). FIG. 2A exemplarily illustrates a representation of a cube 201 of image frames over time. The video stream can thus be visualized as an image cube 201 in XYT coordinates. A slice of the image cube 201 at a point on the X-axis, for example, $x_i$ or on the Y-axis, for example, $y_j$ over all values of time T, results in a reconstructed image that resembles a normal 2D static image, but reproduced in XT coordinates or YT coordinates. The line that intersects x, for all values of Y and T, or the line that intersects $y_j$ for all values of X and T is referred to as the "line of analysis" (LOA) 202.

Figure 2B:
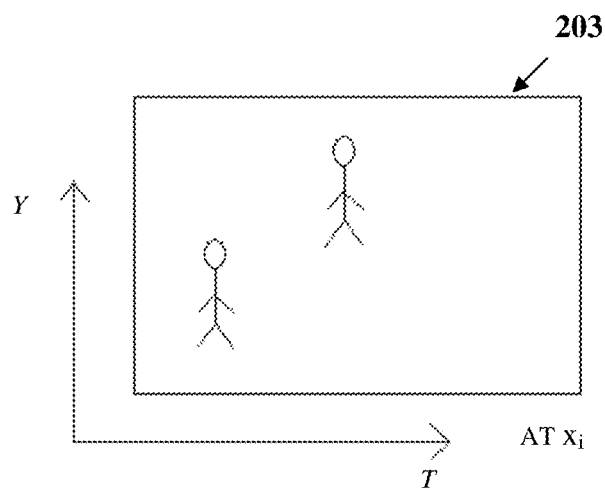
FIG. 2B exemplarily illustrates a spatio-temporal analysis image having spatial coordinates and temporal coordinates.

FIG. 2B exemplarily illustrates a spatio-temporal analysis image 203 having spatial and temporal coordinates. The spatio-temporal analysis image 203 exhibits certain visual characteristics that are interpreted to detect events of interest in any scenario. The relevant events of video surveillance, for example, perimeter breach, movement of objects, removal or addition of objects to a scene, etc., leaves a signature in space when captured and visualized over time (T). The spatio-temporal video content analysis (VCA) in XYT coordinates according to the computer implemented method disclosed herein extracts such signatures and performs pattern recognition over those signatures for detecting objects and events of interest.

Figure 4A:
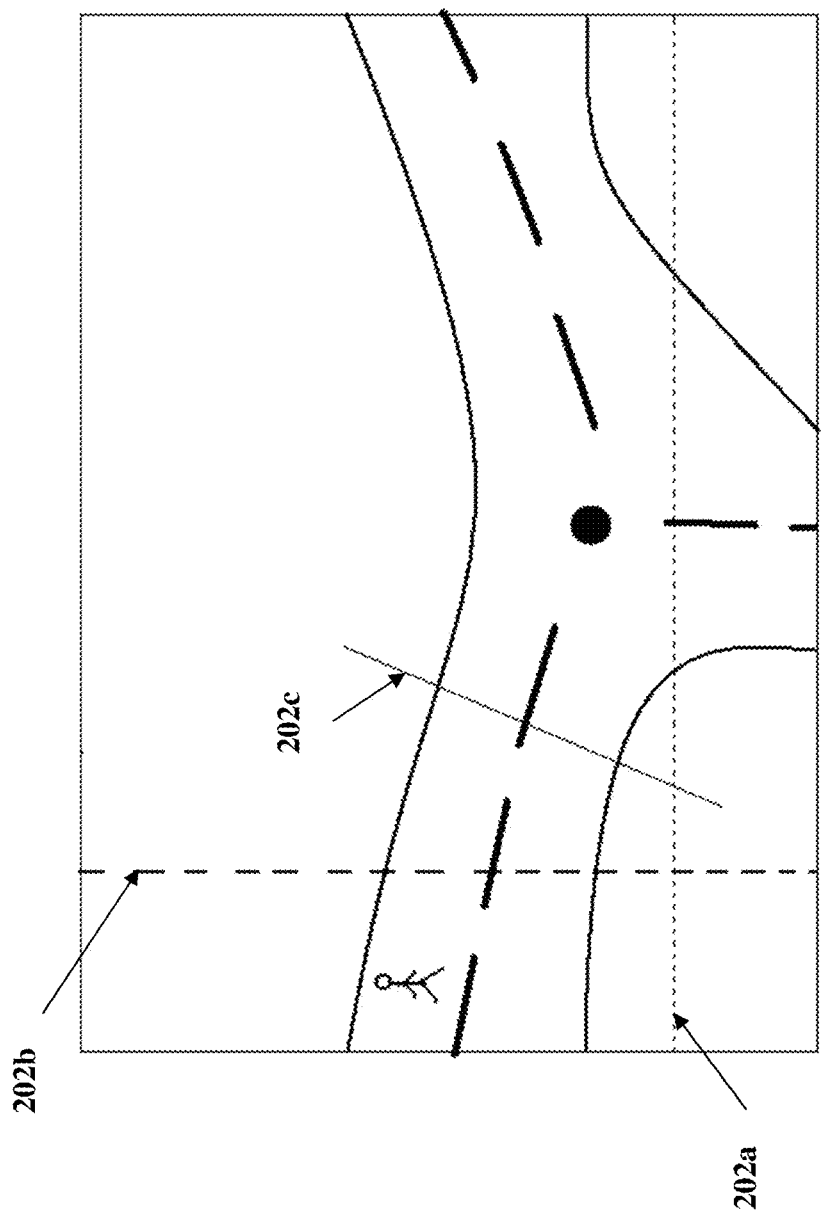
FIG. 4A exemplarily illustrates sample user-defined lines of analysis in different inclinations.

Mathematically, each individual frame of the moving images is represented by I(y, x) and the video stream is represented by I(y, x, t), where x, y and t represent columns, rows and a time-axis, respectively, with the assumption that "x" varies from 0 to N, "y" varies from 0 to M, and "t" varies from 0 to R. A user selects the line of analysis 202 by providing coordinates of the end points of the line 202 using a user interface, for example, a graphical user interface or a textual user interface. The user is presented with one of the image frames, for example, I(y, x, 3) which is the image frame at t=3, as exemplarily illustrated in FIG. 4A, on which the user selects the line of analysis (LOA) 202a, 202b, or 202c. FIG. 4A exemplarily illustrates sample user-defined lines of analysis 202a, 202b, and 202c in different in-plane inclinations with the respect to the 2D plane.

In an example, if the line of analysis 202a is selected along row number 10 and entire "x", the resulting spatio-temporal analysis image 203 is given by I(10, x, t), where "x" varies from 0 to N, and "t" varies from 0 to R. The values of "x" can be specified by a range "x1" to "x2", providing the image I(10, β, t), where "β" varies from x1 to x2, and "t" varies from 0 to R. In another example, if the line of analysis 202b is selected along column number 23 and entire "y", the resulting spatio-temporal analysis image 203 is mathematically given by I(y, 23, t), where "y" varies from 0 to M, and "t" varies from 0 to R. The values of "y" can be specified within a range "y1" to "y2", providing the image I(α, 23, t), where "α" varies from y1 to y2, and "t" varies from 0 to R. Similarly, for a line of analysis 202c selected between any two points, at any inclination and length within the image resolution results in an spatio-temporal analysis image I(α, β, t), where (α, β) specifies the points on the line of analysis 202c varying between y and x values of the two end-points and "t" varies from 0 to R. In an embodiment, the inclined linear arrays of pixels along the line of analysis 202c from the image frames are re-arranged to form vertical lines on the spatio-temporal analysis image 203, yielding a vertical, that is column, spatial axis and a horizontal, that is row, time axis. Alternatively, the inclined linear arrays of pixels along the line of analysis 202c from the image frames are re-arranged to form horizontal lines on the spatio-temporal analysis image 203, thereby yielding a horizontal spatial axis and a vertical time axis.

Figure 4B:
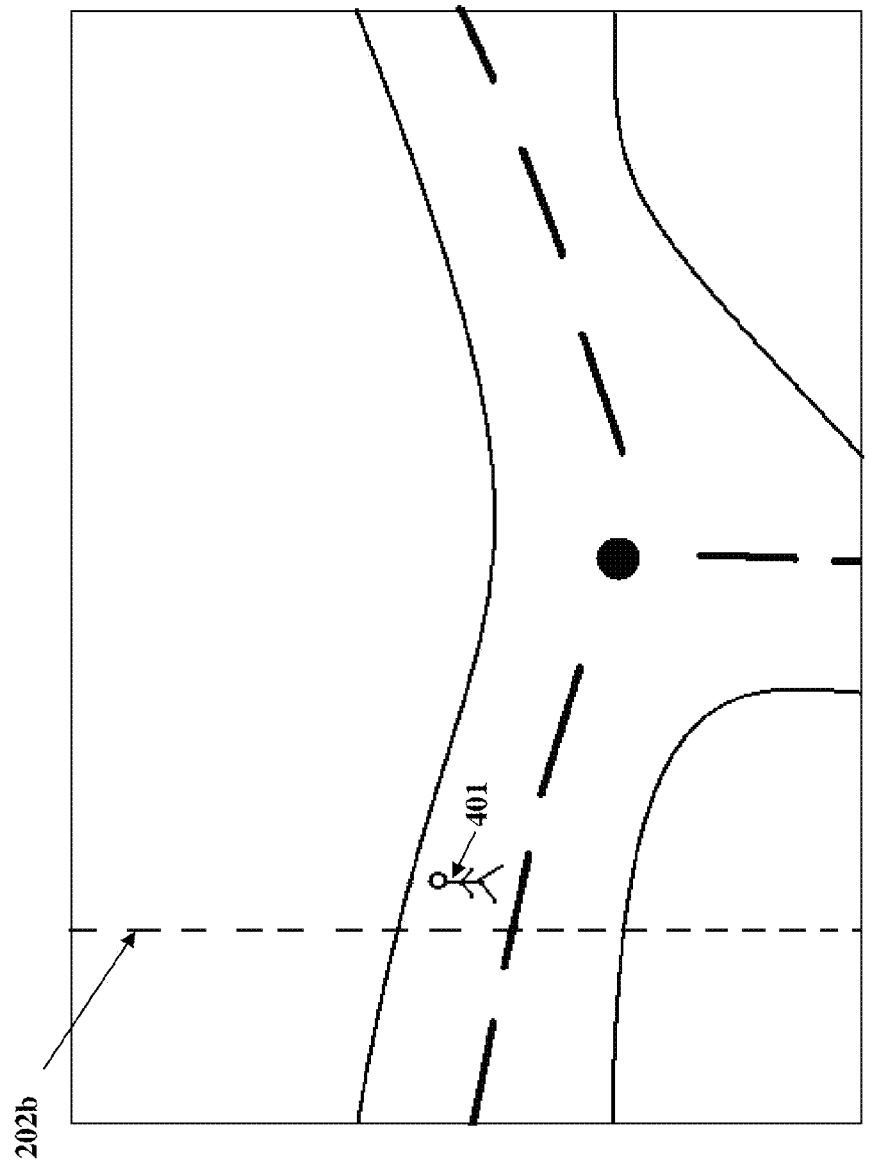
FIG. 4B exemplarily illustrates a user-defined line of analysis intersecting elements in an image frame.
Figure 4C:
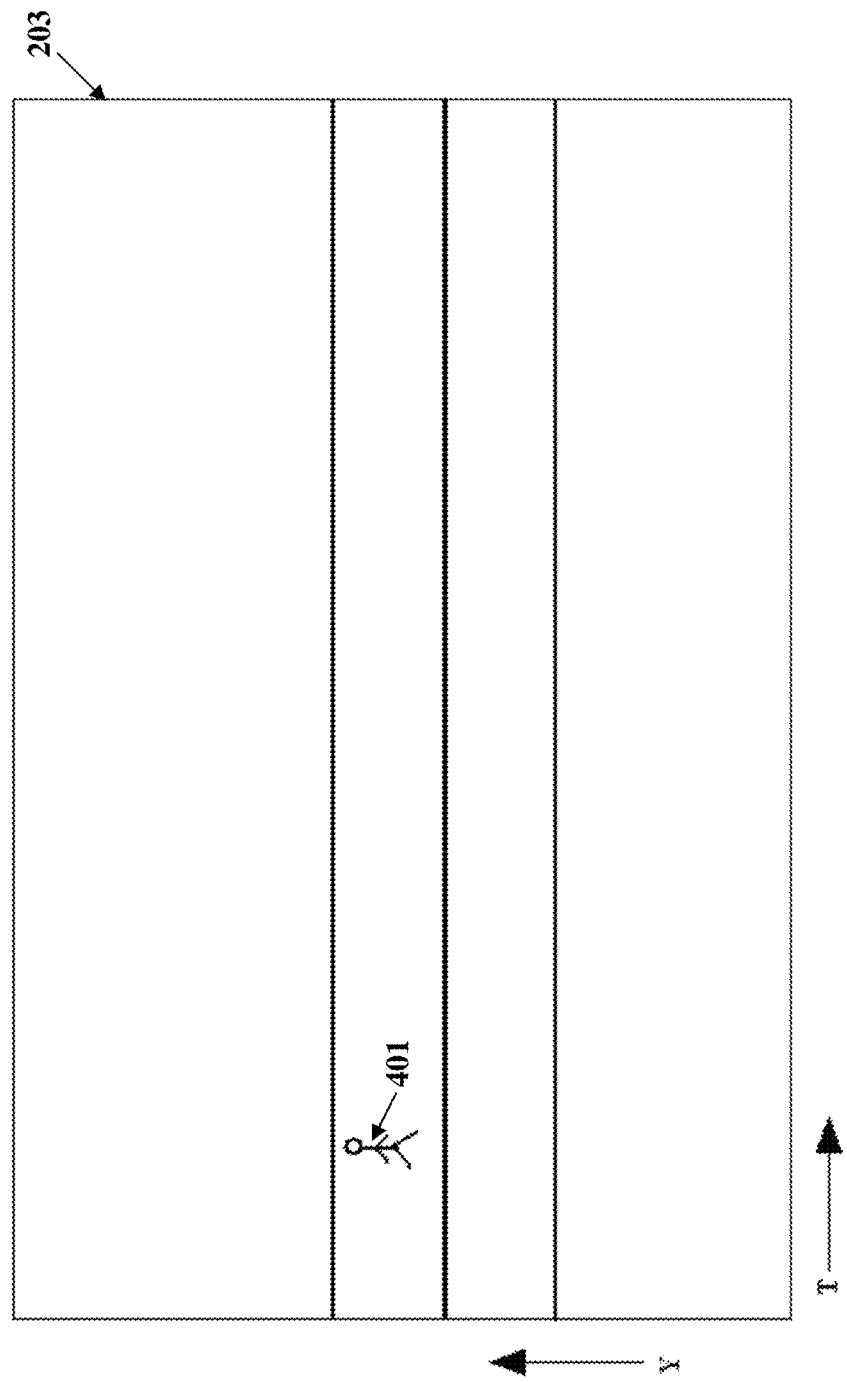
FIG. 4C exemplarily illustrates a spatio-temporal analysis image constructed based on the line of analysis depicted in FIG. 4B.

Consider an example where the user selects a vertical line of analysis 202b, at a point on the x-axis, which varies over the entirety of the y-axis, that is, from 0 to M, as exemplarily illustrated in FIG. 4B. FIG. 4B exemplarily illustrates a user-defined line of analysis 202b that intersects elements, for example, both sides of a street in the image frame. The array of pixels over this line of analysis 202b is accumulated over time "t", for example, over 250 image frames for 10 seconds to construct a spatio-temporal analysis image 203 as exemplarily illustrated FIG. 4C. FIG. 4C exemplarily illustrates a spatio-temporal analysis image 203 constructed based on the line of analysis 202b depicted in FIG. 4B. This spatio-temporal analysis image 203 is mathematically represented by a fixed horizontal spatial coordinate (x), vertical variable coordinates (y), for example, y1 to y2, and variable temporal coordinates (t). This spatio-temporal analysis image 203 has a resolution of L×T, where "L" is the length of the line of analysis 202b and "T" is the product of time of analysis in seconds and frame rate of the video.

FIG. 4C also illustrates three horizontal lines and a human object 401 on the spatio-temporal analysis image 203. The three horizontal lines running along time "t" appear in the spatio-temporal analysis image 203 due to the intersection of the line of analysis 202b with the street borders and the street median. The human object 401 is reproduced in the spatio-temporal analysis image 203, since the human object 401 crosses or moves across the line of analysis 202b, exposing itself as a linear pixelled array on each image frame which are accumulated over time "t". The spatio-temporal analysis image 203 exemplarily illustrated in FIG. 4C is a summary of events occurring over 250 image frames or 10 seconds of the video along the line of analysis 202b, and is used for visualization and segmentation for detecting events of interest.

A moving image capture device, for example, a closed-circuit television (CCTV) camera used for surveillance is mounted on rooftops or in tunneling toll booths and may be adapted for panning over a limited sweep angle or subjected to undue jitter. The linear array of pixels selected from each image frame based on the line of analysis 202 reproduces a specific section of the actual image captured at a single instance of time (t). In an embodiment, where the camera is panning over a limited sweep angle, the coordinates of the line of analysis 202 may be dynamically shifted to continue to focus the analysis at a specific part of the actual scene. The coordinates of the line of analysis 202 may be dynamically shifted by obtaining the pan direction and pan magnitude during every transition from one image frame to another. Also, the coordinates of the line of analysis 202 may be dynamically shifted by obtaining the average pan direction and pan magnitude, or the velocity over a single sweep of the camera. This ensures that the linear array of pixels extracted from each successive image frame represents identical section or part of the actual scene, when the moving image capture device is panning over a limited sweep angle. This however requires that the focused part(s) of the scene always remains within the field of view of the camera. Where the camera may be subjected to a momentary jitter, a wider line of analysis 202 is used to compensate for the jitter. Additionally or alternatively, the spatio-temporal analysis image 203 may be constructed by concatenating linear pixel arrays from every Nth successive image frame, for example, every $3^{rd}$ successive frame in the series of image frames, drowning out momentary fluctuations in the constructed spatio-temporal analysis image 203.

Figure 3:
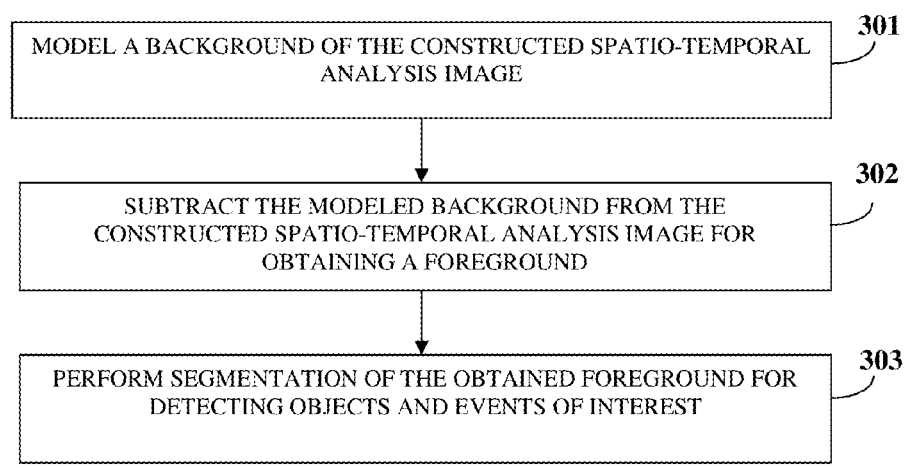
FIG. 3 exemplarily illustrates foreground segmentation of the spatio-temporal analysis image for detecting objects and events of interest.

FIG. 3 exemplarily illustrates foreground segmentation of the spatio-temporal analysis image 203 for detecting objects and events of interest. A background of the constructed spatio-temporal analysis image 203 is modeled 301, for example, by determining a moving average of the linear pixel arrays along the temporal dimension (t). The modeled background is subtracted 302 from the constructed spatio-temporal analysis image 203 for obtaining the foreground of the constructed spatio-temporal analysis image 203. The segmentation of the obtained foreground is performed 303 for detecting objects and events of interest.

The video content analysis of the spatio-temporal analysis image 203 using foreground segmentation may be performed using different techniques for background modeling and segmentation of the constructed spatio-temporal analysis image 203. The background modeling and segmentation according to the computer implemented method disclosed herein employs, for example, the moving average technique to determine the moving average of each vertical line of the spatio-temporal analysis image 203 of FIG. 4C. Each vertical line in the spatio-temporal analysis image 203 of FIG. 4C corresponds to the line of analysis 202 an image frame in the video at a specific instance of time, which is used to construct the spatio-temporal analysis image 203. Mathematically, the spatio-temporal analysis image 203 of FIG. 4C can be represented as follows:

$$I(y, \alpha, t);$$

where I(y, α, t) is taken at x=α, where a is a value in the range of "x" between 0 to N, "y" varies from 0 to M and "t" varies from 0 to R.

The background of the spatio-temporal analysis image 203 is determined by applying a weighted moving average of the linear pixel arrays over time "t". To begin with, the background of the image frame at "t0" corresponding to the linear pixel array in the spatio-temporal analysis image 203 at "t0" is modeled as follows:

$$B(y, \alpha, t0) = I(y, \alpha, t0);$$

Similarly, B(y, α, t1)=I(y, α, t1)*δ+B(y, α, t0)*(1−δ), where "δ" is a background adapting factor and is always 0≤δ≤1; and "t0" and "t1" are the either absolute or relative time indices, representing the image frames from which the linear arrays of pixels are taken. "(y, α, t1)" corresponds to the linear array taken at "α" column (LOA), for selected range of rows "y" on the image frame at time "t1". B(y, α, t0) is the background modeled at image frame "t0" and can be a line array with all zeros. B(y, α, t1) is the background modeled at image frame "t1". The background image, exemplarily illustrated in FIG. 4D, is generated by similarly modeling the background up to time tR, with the background being optionally modeled at each time instance (t0 to tR) in real time, as the spatio-temporal analysis image 203 is constructed.

Figure 4D:
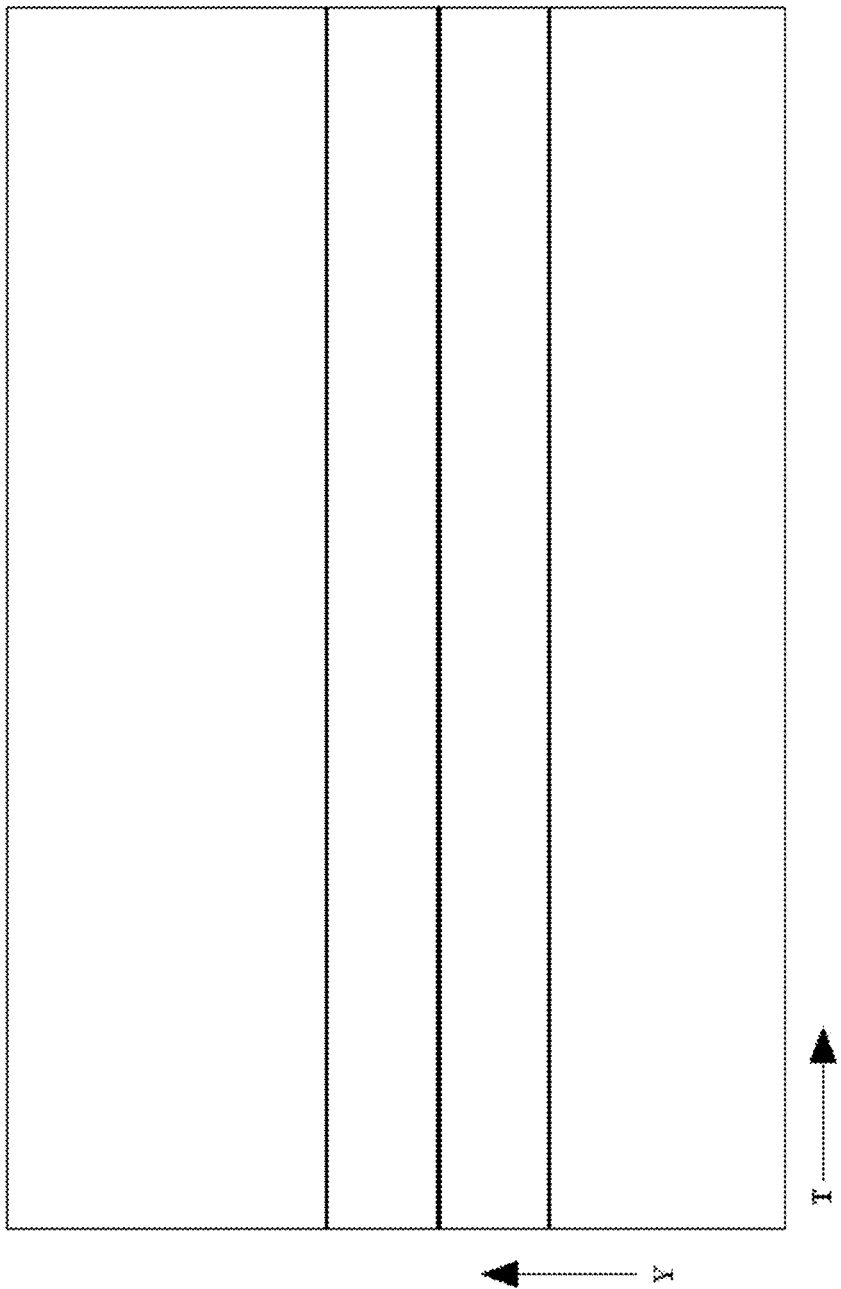
FIG. 4D exemplarily illustrates a modeled background of the spatio-temporal analysis image depicted in FIG. 4C.

The foreground is segmented by obtaining the absolute difference between the spatio-temporal analysis image 203 of FIG. 4C and the background image of FIG. 4D, and thresholding the differences. For example, segmentation on the spatio-temporal analysis image 203 at "t1" is performed by taking the absolute of the difference between I(y, α, t1) and B(y, α, t1), and thresholding the difference as follows:

$$D(y, \alpha, t1) = 1 \text{ if "absolute}(B(y, \alpha, t1) - I(y, \alpha, t1)) \geq \text{threshold};$$

$$D(y, \alpha, t1) = 0 \text{ if "absolute}(B(y, \alpha, t1) - I(y, \alpha, t1)) < \text{threshold};$$

Figure 4E:
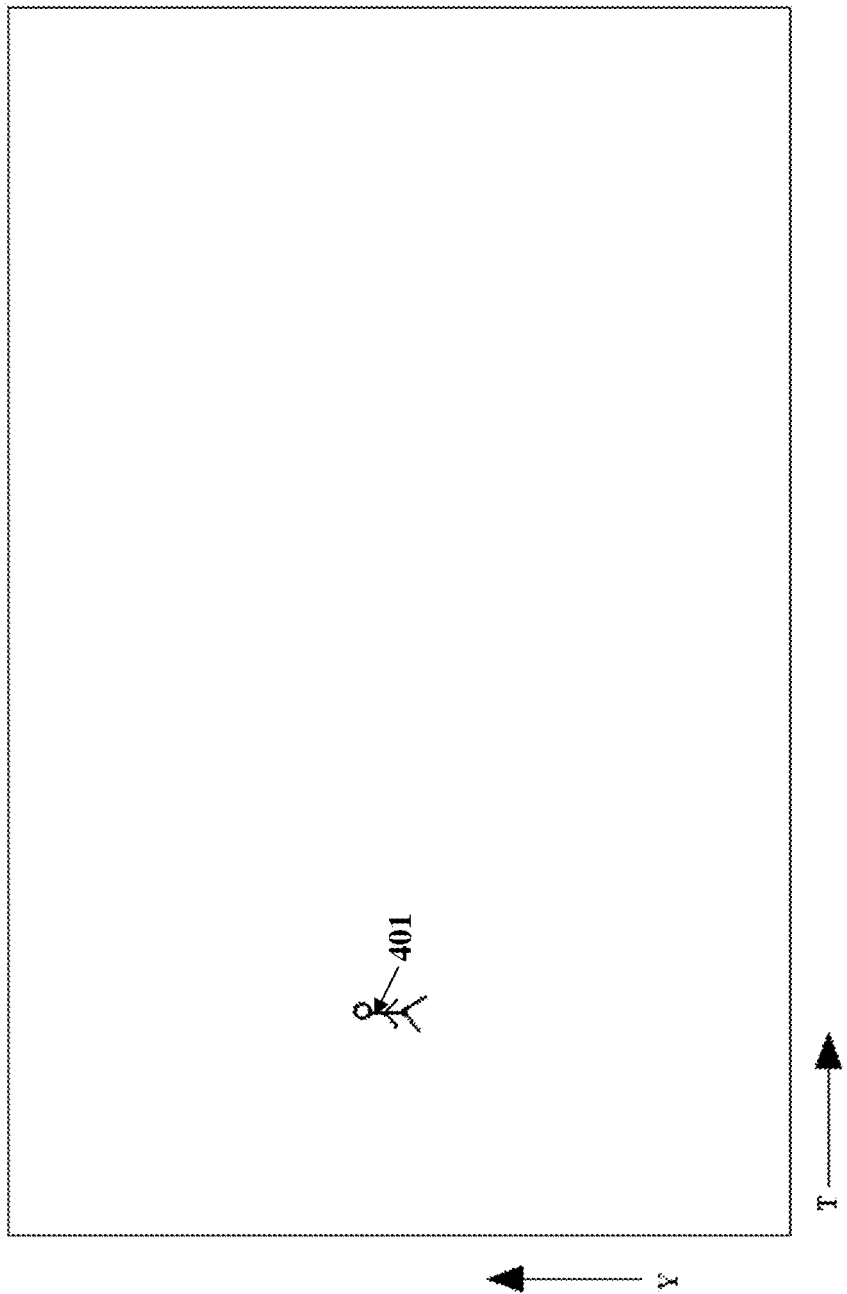
FIG. 4E exemplarily illustrates a segmented foreground of the spatio-temporal analysis image depicted in FIG. 4C.

The segmented image SI(y, t) is obtained by accumulating D(y, α, t0), D(y, α, t1), D(y, α, t2) . . . so on till D(y, α, tR), since "t" varies from 0 to R. The foreground segmented image SI(y, t) is illustrated in FIG. 4E.

The spatio-temporal or XYT analysis provides a background model using a single line of pixels as opposed to the conventional background models that process the entire image. Given a video graphics array (VGA) image of 640× 480 pixels, the background modeling and segmentation according to the computer implemented method disclosed herein processes 480 pixels for analysis instead of the entire 307200 pixels. The line of analysis 202 is, for example, one pixel wide and hence precludes any duplication of objects, unless the objects cross the line of analysis 202 more than once. The spatio-temporal analysis for video content is, for example, used for people or vehicle count with better accuracy. The XYT analysis summarizes the video of a few gigabytes (GB) for monitoring a highway, a tollgate, an entrance to an office, or an industry or commercial premises, etc., in a few megabytes (MB) of memory. The spatio-temporal analysis image 203 is used for visualization, with each line along the time axis (t) of the spatio-temporal analysis image 203 specifying the unit of time that is used for time indexing for navigating through the video.

The spatio-temporal analysis image 203 constructed by the spatio-temporal analysis of the video exhibits a few notable unique characteristics. For example, if an object remains stationary on the line of analysis 202, the reproduction of the object in the spatio-temporal analysis image appears stretched or elongated along the temporal dimension (t). On the other hand, if an object traverses the line of analysis 202 at a high speed, the object appears compressed in the spatio-temporal analysis image. The spatio-temporal analysis according to the computer implemented method disclosed herein is a valuable technique to summarize an entire day's traffic at a toll gate and the shopper traffic at the entrance of a mall, to determine traffic line violations, the speed of vehicles, perimeter breach in a mining area, industrial or commercial campuses, etc.

Figure 5:
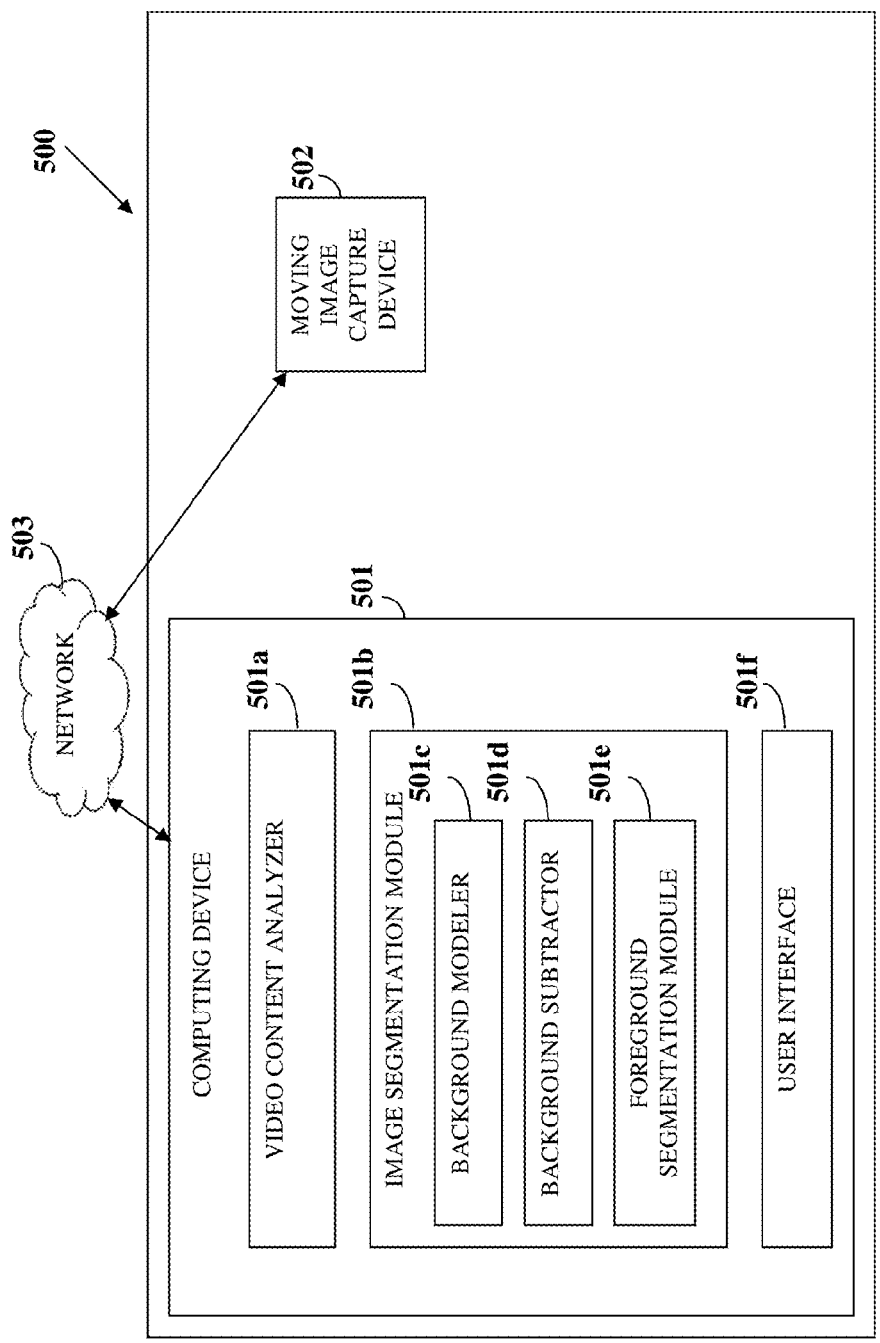
FIG. 5 illustrates a computer implemented system for capturing events of interest by performing a spatio-temporal analysis of a video.

FIG. 5 illustrates a computer implemented system 500 for capturing events of interest by performing a spatio-temporal analysis of a video. The computer implemented system 500 disclosed herein comprises a moving image capture device 502 and a computing device 501. The computing device 501 of the computer implemented system 500 disclosed herein comprises a video content analyzer 501a, an image segmentation module 501b, and a user interface 501f. The moving image capture device 502, for example, a surveillance camera acquires a continuous video stream containing a series of image frames over time. Each of the image frames is represented by horizontal spatial coordinates and vertical spatial coordinates of a two dimensional plane. The moving image capture device 502 may be connected to a network 503, for example, a local area network to transfer the acquired moving images over the network 503 to the computing device 501. In an embodiment, the moving device capture device 502 is connected to the computing device 501 via serial and parallel communication ports, for example, using a universal serial bus (USB) specification. In another embodiment, the moving image capture device 502 may comprise a dedicated processor and memory for installing and executing the video content analyzer 501a, the image segmentation module 501b, and the user interface 501f.

The video content analyzer 501a provided on the computing device 501 assigns a temporal dimension across the image frames of the video stream. The temporal dimension represents the order of the image frames using predefined temporal coordinates. The video content analyzer 501a constructs a spatio-temporal analysis image 203 based on a user-defined line of analysis 202 on each of the image frames. The video content analyzer 501a constructs the spatio-temporal analysis image 203 by concatenating a series of temporally-successive linear pixel arrays along the temporal dimension. Each of the linear pixel arrays comprises an array of pixels underlying the line of analysis 202 defined on each of the image frames. The image segmentation module 501b on the computing device 501 segments the constructed spatio-temporal analysis image 203 for capturing the events of interest.

The user interface 501f, for example, a graphical user interface or a textual user interface on the computing device 501 renders one or more image frames of a stored video or a live video to the user. The user interface 501f enables the user to define the line of analysis 202, having any in-plane orientation, length and width, on the image frames. In an embodiment, the user interface 501f enables the user to define one or more lines of analysis 202 for parallely constructing multiple spatio-temporal analysis images. The constructed spatio-temporal analysis image 203 provides a summary of events occurring over the image frames at the line of analysis 202 for the duration of the video or the duration of the concatenation of the series of temporally-successive linear pixel arrays. The spatio-temporal analysis image 203 is represented by, for example, a combination of a fixed horizontal spatial coordinate, a range of the vertical spatial coordinates, and variable temporal coordinates, or a combination of a fixed vertical spatial coordinate, a range of the horizontal spatial coordinates, and variable temporal coordinates.

The image segmentation module 501b performs foreground segmentation of the constructed spatio-temporal analysis image 203 for detecting objects and events of interest. The image segmentation module 501b comprises a background modeler 501c, a background subtractor 501d, and a foreground segmentation module 501e. The background modeler 501c models the background of the constructed spatio-temporal analysis image 203, for example, by determining a moving average of the linear pixel arrays along the temporal dimension. The background subtractor 501d subtracts the modeled background from the constructed spatio-temporal analysis image 203 by obtaining the absolute difference between the constructed spatio-temporal analysis image 203 and the modeled background for obtaining foreground of the spatio-temporal analysis image 203. The foreground segmentation module 501e performs segmentation of the obtained foreground for detecting objects and events of interest, for example, presence of an object, traversal of the object, speed of traversal of the object, an object count based on the traversal of one or more objects, duration of the presence of an object, etc.

Figure 6:
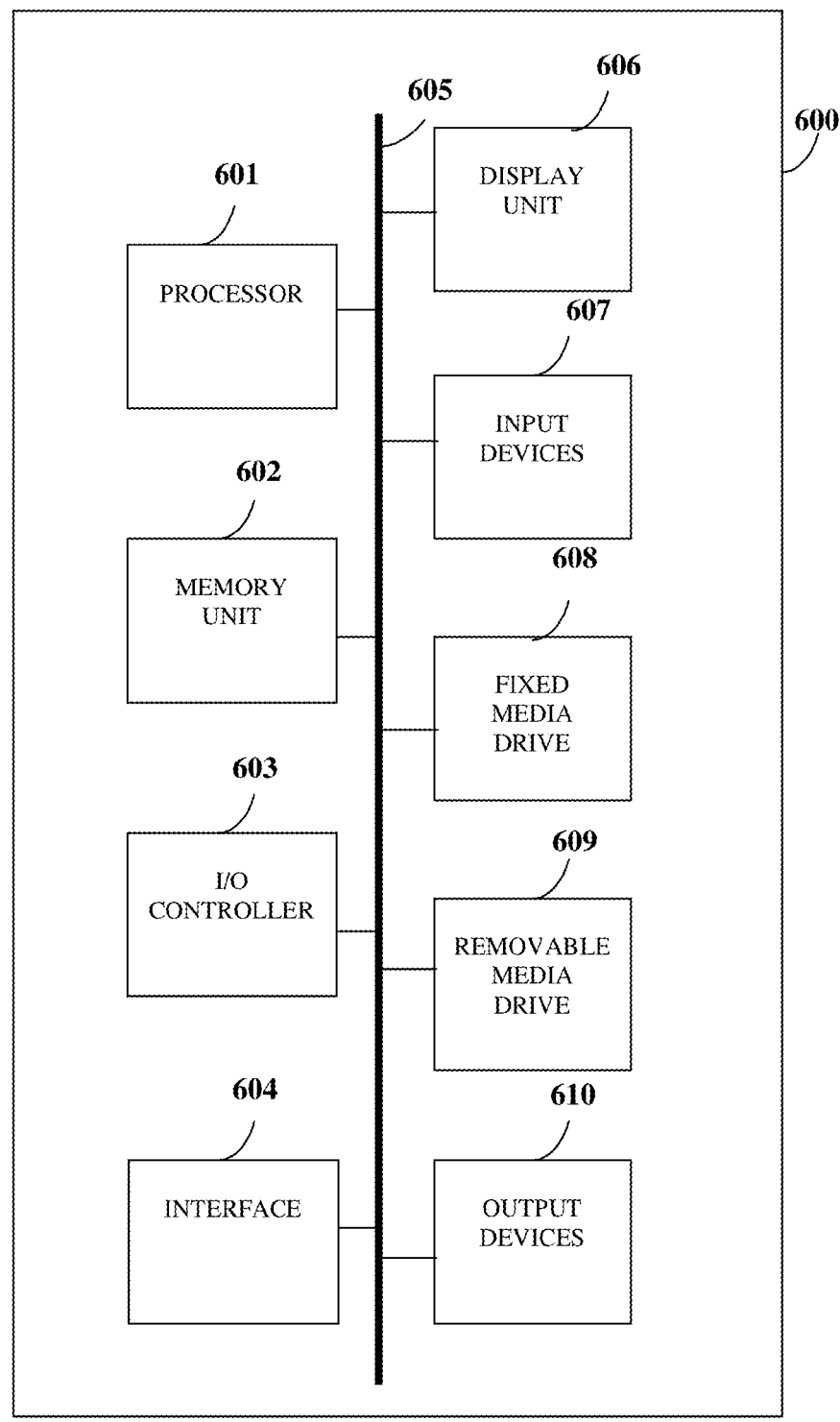
FIG. 6 exemplarily illustrates the architecture of a computer system used for capturing events of interest by performing a spatio-temporal analysis of a video.

FIG. 6 exemplarily illustrates the architecture of a computer system 600 used for capturing events of interest by performing a spatio-temporal analysis of a video. The computer system 600 comprises a processor 601, a memory unit 602 for storing programs and data, an input/output (I/O) controller 603, and a display unit 606 communicating via a data bus 605. The memory unit 602 comprises a random access memory (RAM) and a read only memory (ROM). The computer system 600 comprises one or more input devices 607, for example, a keyboard such as an alphanumeric keyboard, a mouse, a joystick, etc. The input/output (I/O) controller 603 controls the input and output actions performed by a user. The computer system 600 communicates with other computer systems through an interface 604, for example, a Bluetooth™ interface, an infrared (IR) interface, a WiFi interface, a universal serial bus interface (USB), a local area network (LAN) or wide area network (WAN) interface, etc.

The processor 601 is an electronic circuit that can execute computer programs. The memory unit 602 is used for storing programs, applications, and data. For example, the video content analyzer 501a and the image segmentation module 501b are stored on the memory unit 602 of the computer system 600. The memory unit 602 is, for example, a random access memory (RAM) or another type of dynamic storage device that stores information and instructions for execution by processor 601. The memory unit 602 also stores temporary variables and other intermediate information used during execution of the instructions by the processor 601. The computer system 600 further comprises a read only memory (ROM) or another type of static storage device that stores static information and instructions for the processor 601. The data bus 605 permits communication between the modules, for example, 501a, 501b, 501c, 501d, 501e, and 501f of the computer implemented system 500 disclosed herein.

Computer applications and programs are used for operating the computer system 600. The programs are loaded onto the fixed media drive 608 and into the memory unit 602 of the computer system 600 via the removable media drive 609. In an embodiment, the computer applications and programs may be loaded directly through the network 503. Computer applications and programs are executed by double clicking a related icon displayed on the display unit 606 using one of the input devices 607. The user interacts with the computer system 600 using a user interface 501f of the display unit 606. The user selects the line of analysis 202 of any orientation, size, and thickness on one or more image frames on the user interface 501f of the display unit 606 using one of the input devices 607, for example, a computer mouse.

The computer system 600 employs an operating system for performing multiple tasks. The operating system manages execution of, for example, the video content analyzer 501a and the image segmentation module 501b provided on the computer system 600. The operating system further manages security of the computer system 600, peripheral devices connected to the computer system 600, and network connections. The operating system employed on the computer system 600 recognizes keyboard inputs of a user, output display, files and directories stored locally on the fixed media drive 608, for example, a hard drive. Different programs, for example, a web browser, an e-mail application, etc., initiated by the user are executed by the operating system with the help of the processor 601, for example, a central processing unit (CPU). The operating system monitors the use of the processor 601.

The video content analyzer 501a and the image segmentation module 501b are installed in the computer system 600 and the instructions are stored in the memory unit 602. The captured moving images are transferred from the moving image capture device 502 to the video content analyzer 501a installed in the computer system 600 of the computing device 501 via the interface 604 or a network 503. A user initiates the execution of the video content analyzer 501a by double clicking the icon for the video content analyzer 501a on the display unit 606 or the execution of the video content analyzer 501a is automatically initiated on installing the video content analyzer 501a on the computing device 501. Instructions for capturing events of interest by performing spatio-temporal analysis of the video are retrieved by the processor 601 from the program memory in the form of signals. The locations of the instructions from the modules, for example, 501a, 501b, 501c, 501d, and 501e, are determined by a program counter (PC). The program counter stores a number that identifies the current position in the program of the video content analyzer 501a and the image segmentation module 501b.

The instructions fetched by the processor 601 from the program memory after being processed are decoded. The instructions are placed in an instruction register (IR) in the processor 601. After processing and decoding, the processor 601 executes the instructions. For example, the video content analyzer 501a defines instructions for assigning a temporal dimension across the image frames of the video stream. The video content analyzer 501a further defines instructions for constructing a spatio-temporal analysis image 203 based on a user-defined line of analysis 202 on each of the image frames. The image segmentation module 501b defines instructions for segmenting the constructed spatio-temporal analysis image 203 for capturing the events of interest. The background modeler 501c defines instructions for modeling the background of the constructed spatio-temporal analysis image 203. The background subtractor 501d defines instructions for subtracting the modeled background from the constructed spatio-temporal analysis image 203 for obtaining the foreground of the constructed spatio-temporal analysis image 203. The foreground segmentation module 501e defines instructions for performing segmentation of the obtained foreground for detecting objects and events of interest. The instructions are stored in the program memory or received from a remote server.

The processor 601 retrieves the instructions defined by the video content analyzer 501a, the image segmentation module 501b, the background modeler 501c, the background subtractor 501d, and the foreground segmentation sub-module 501e, and executes the instructions.

At the time of execution, the instructions stored in the instruction register are examined to determine the operations to be performed. The specified operation is then performed by the processor 601. The operations include arithmetic and logic operations. The operating system performs multiple routines for performing a number of tasks required to assign input devices 607, output devices 610, and memory for execution of the video content analyzer 501a and the image segmentation module 501b. The tasks performed by the operating system comprise assigning memory to the video content analyzer 501a, the image segmentation module 501b and data, moving data between the memory 602 and disk units and handling input/output operations. The operating system performs the tasks on request by the operations and after performing the tasks, the operating system transfers the execution control back to the processor 601. The processor 601 continues the execution to obtain one or more outputs. The outputs of the execution of the video content analyzer 501a and the image segmentation module 501b are displayed to the user on the display unit 606.

Figure 7A:
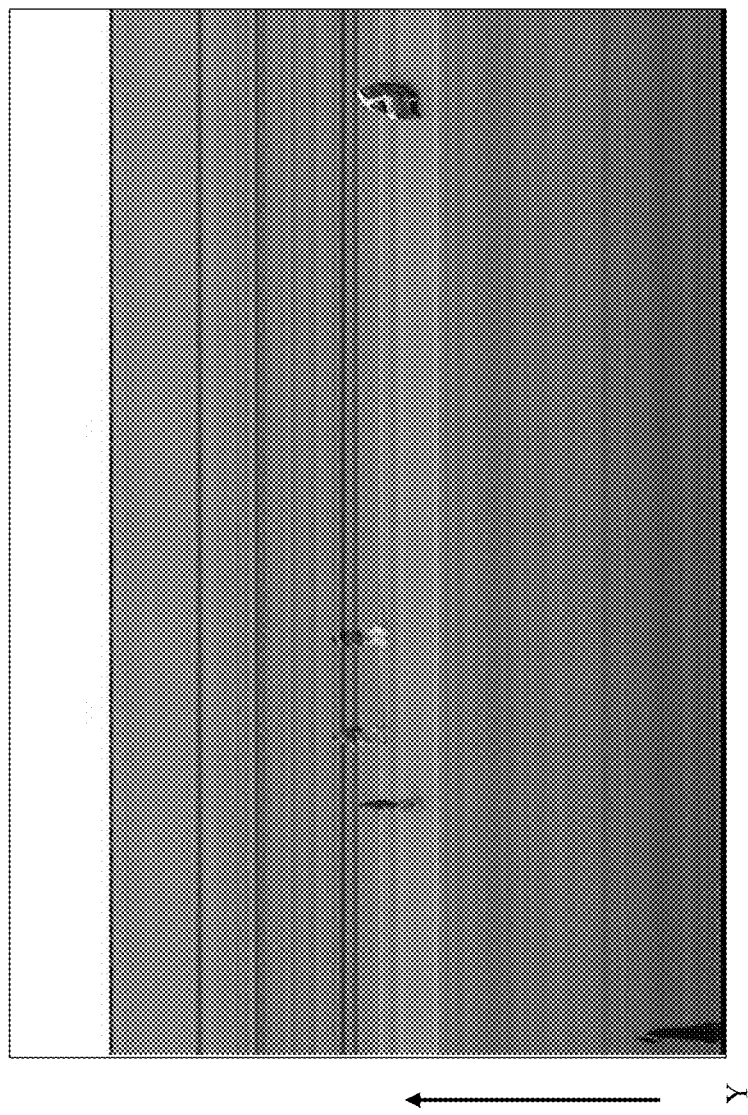
FIG. 7A exemplarily illustrates a screenshot of a spatio-temporal analysis image constructed based on a user-defined line of analysis.
Figure 7B:
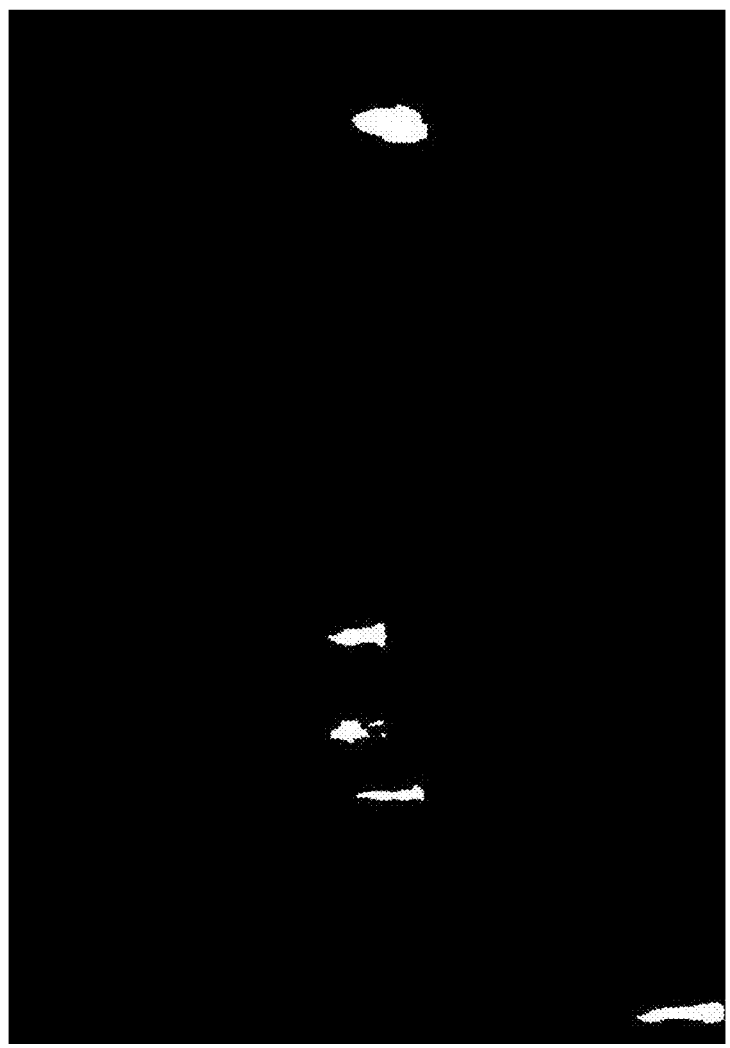
FIG. 7B exemplarily illustrates a binary difference image of FIG. 7A.
Figure 7C:
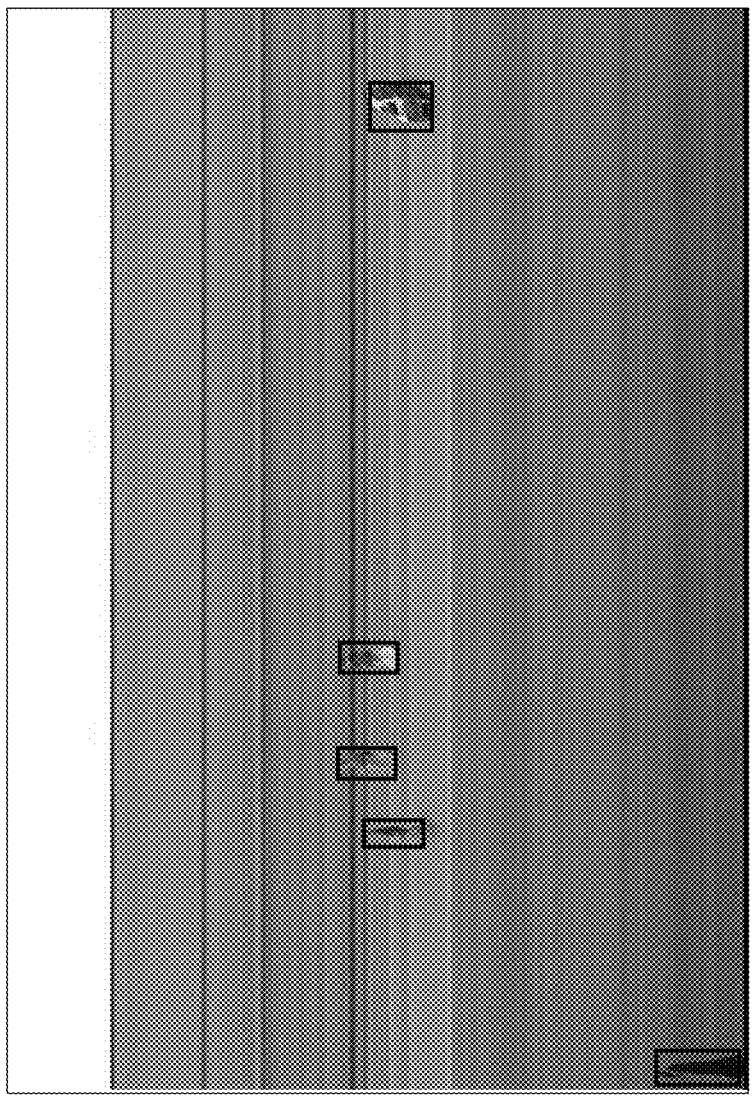
FIG. 7C exemplarily illustrates foreground segmentation of the spatio-temporal analysis image of FIG. 7A.

FIG. 7A exemplarily illustrates a screenshot of a spatio-temporal analysis image constructed based on a user-defined line of analysis 202. As illustrated in FIG. 7A, the spatio-temporal analysis image is constructed based on a vertical line of analysis 202b selected at a point on the x-axis (Xi), which varies over the entirety of the y-axis. FIG. 7B exemplarily illustrates a binary difference image of FIG. 7A. FIG. 7C exemplarily illustrates foreground segmentation of the spatio-temporal analysis image of FIG. 7A. The foreground segmentation reveals that four pedestrians and a vehicle have passed the line of analysis 202b over a finite time period T of the video being analyzed.

The spatio-temporal analysis of a video also referred to as "video content analysis" according to the computer implemented method and system 500 disclosed herein for constructing and segmenting the spatio-temporal analysis image provides different video content analysis applications for monitoring and surveillance in different scenarios. A few applications in different scenarios are disclosed herein. The spatio-temporal analysis is used to determine a count of people over a predetermined duration. The people count is determined by the count of foreground objects in the spatio-temporal analysis image. The spatio-temporal analysis image is constructed by accumulating the linear pixels arrays from the image frames of the video, based on the line of analysis 202, over the predetermined duration. In this case, the line of analysis 202 is defined across a doorway, a passageway, or a corridor dominated by incoming and outgoing people.

In another scenario, where the line of analysis 202 is selected to depict a perimeter line, the spatio-temporal analysis at the line of analysis 202 is used to detect a perimeter breach or simulate a tripwire. When an object crosses the line of analysis 202, the object is reproduced in the spatio-temporal analysis image 203, as illustrated in FIG. 4C. The spatio-temporal analysis image is generated over time and segmented to determine the number of perimeter breaches and the time of perimeter breaches.

Figure 8:
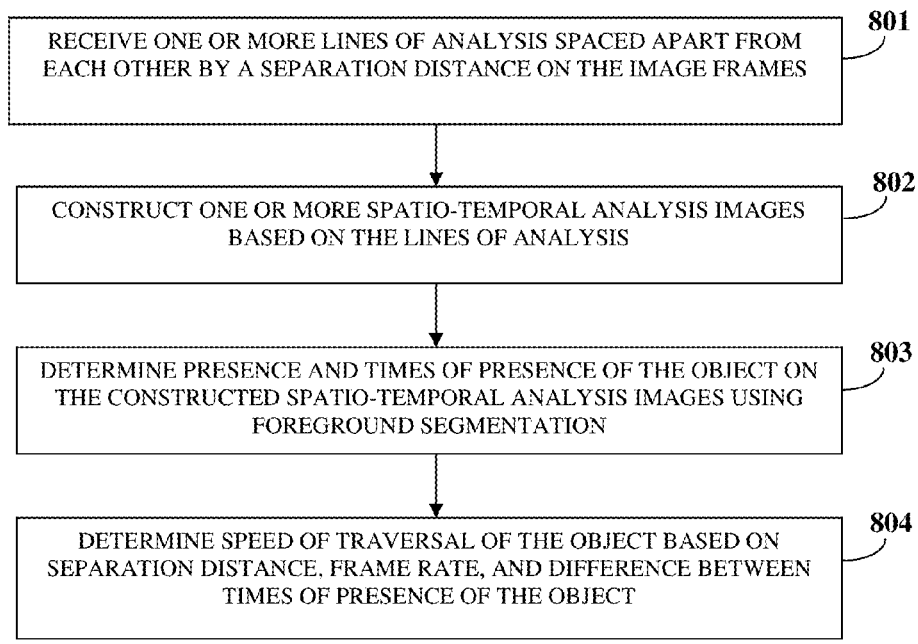
FIG. 8 exemplarily illustrates a computer implemented method for determining speed of traversal of an object using spatio-temporal analysis of a video.

In another scenario, the speed of traversal of the object, for example, a moving vehicle is determined using one or more spatio-temporal analysis images. FIG. 8 exemplarily illustrates a computer implemented method for determining speed of traversal of an object using spatio-temporal analysis of a video. The speed of an object is determined by receiving 801 one or more lines of analysis 202, for example, at $X_i$ and $X_k$ spaced apart from each other by a separation distance on the image frames from a user. The separation distance is based on an actual distance in the actual scene being captured. One or more spatio-temporal analysis images are constructed 802 based on the lines of analysis 202. The presence and the times of presence of the object on the constructed spatio-temporal analysis images, for example, $X_iYT$ and $X_kYT$ are determined 803 using foreground segmentation disclosed in the detailed description of FIG. 3. The speed of traversal of the object is determined 804 based on the separation distance, frame rate of the video and difference between times of presence of the object on the constructed spatio-temporal analysis images.

Other applications based on similar principles include, for example, determining the winner in a track race. In this case, the line of analysis 202 is defined along the finish line of a track. A spatio-temporal analysis image is constructed based on the line of analysis 202 to determine the race winner based on the time of appearance of the participants or athletes on the spatio-temporal analysis image. The spatio-temporal analysis disclosed herein also enables automated parking lot management. The length of the stretch or elongation of an object, for example, a stationary vehicle on the spatio-temporal analysis image provides the parking duration of the stationary vehicle. The line of analysis 202 is defined within the parking slot with a suitable orientation and length. In the same way, the vacant slots in a parking lot are determined by considering the binary difference image of the spatio-temporal (XYT) image of the parking lot. For example, white patches on the binary difference image correspond to occupied slots, while black patches correspond to the unoccupied slots. In road traffic management, where video monitoring is installed in the area around traffic lights and intersections, the line of analysis 202 is suitably defined along the road markings to enable video content analysis. At an unmanned railway crossing installed with video surveillance, the line of analysis 202 is defined along the rail track for video content analysis. In a museum with video surveillance for monitoring exhibits such as paintings or statues, video content analysis is performed at specific parts of the scene by defining the line of analysis 202 at those parts.

The events of interest in a scene may be specific to the application scenario and requirement, and the general arrangement or landscape of the captured scene. A person of ordinary skill in the art or any user in the monitoring and surveillance domain can easily recognize parts of a scene that require content analysis, and accordingly define one or more lines of analysis 202 on one or more image frames, including the orientation, length and width of the lines of analysis 202, for performing spatio-temporal analysis.

It will be readily apparent that the various methods and algorithms described herein may be implemented in a computer readable medium appropriately programmed for general purpose computers and computing devices. Typically a processor, for example, one or more microprocessors will receive instructions from a memory or like device, and execute those instructions, thereby performing one or more processes defined by those instructions. Further, programs that implement such methods and algorithms may be stored and transmitted using a variety of media, for example, computer readable media in a number of manners. In one embodiment, hard-wired circuitry or custom hardware may be used in place of, or in combination with, software instructions for implementation of the processes of various embodiments. Thus, embodiments are not limited to any specific combination of hardware and software. A "processor" means any one or more microprocessors, central processing unit (CPU) devices, computing devices, microcontrollers, digital signal processors or like devices. The term "computer readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include dynamic random access memory (DRAM), which typically constitutes the main memory. Transmission media include coaxial cables, copper wire and fiber optics, including the wires that comprise a system bus coupled to the processor. Common forms of computer readable media include, for example, a floppy disk, a flexible disk, hard disk, magnetic tape, any other magnetic medium, a compact disc-read only memory (CD-ROM), digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, a carrier wave as described hereinafter, or any other medium from which a computer can read. In general, the computer readable programs may be implemented in any programming language. Some examples of languages that can be used include C, C++, C#, Perl, Python, or JAVA. The software programs may be stored on or in one or more mediums as an object code. A computer program product comprising computer executable instructions embodied in a computer readable medium comprises computer parsable codes for the implementation of the processes of various embodiments.

The present invention can be configured to work in a network environment including a computer that is in communication, via a communications network, with one or more devices. The computer may communicate with the devices directly or indirectly, via a wired or wireless medium such as the Internet, a local area network (LAN), a wide area network (WAN) or the Ethernet, token ring, or via any appropriate communications means or combination of communications means. Each of the devices may comprise computers, such as those based on the Intel® processors, AMD® processors, UltraSPARC® processors, Sun® processors, IBM° processors, etc. that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A computer implemented method for capturing events of interest by performing a spatio-temporal analysis of a video, comprising:
    acquiring a continuous video stream containing a series of image frames over time, wherein each of said image frames is represented by horizontal spatial coordinates and vertical spatial coordinates of a two dimensional plane;
    assigning a temporal dimension across said image frames of said video stream, wherein said temporal dimension represents order of said image frames using predefined temporal coordinates;
    constructing a spatio-temporal analysis image based on a user-defined line of analysis on each of one or more of said image frames, wherein said spatio-temporal analysis image is constructed by concatenating a series of temporally-successive linear pixel arrays along said temporal dimension, each of said linear pixel arrays comprising an array of pixels along said line of analysis defined on said each of said one or more of said image frames; and
    segmenting said constructed spatio-temporal analysis image for capturing said events of interest.

2. The computer implemented method of claim 1, further comprising defining said line of analysis along one or more of said horizontal spatial coordinates, said vertical spatial coordinates, and a combination of said horizontal spatial coordinates and said vertical spatial coordinates in one or more of said image frames, by a user.

3. The computer implemented method of claim 1, wherein said constructed spatio-temporal analysis image is represented by one of a combination of a fixed horizontal spatial coordinate, a range of said vertical spatial coordinates and variable temporal coordinates, and a combination of a fixed vertical spatial coordinate, a range of said horizontal spatial coordinates and variable temporal coordinates.

4. The computer implemented method of claim 1, wherein said constructed spatio-temporal analysis image provides a summary of events occurring over said image frames at said line of analysis for one of a duration of said video and a duration of said concatenation of said series of said temporally-successive linear pixel arrays.

5. The computer implemented method of claim 1, wherein a width of each of said linear pixel arrays is substantially identical to a width of said line of analysis, wherein said width of said line of analysis is at least a single pixel.

6. The computer implemented method of claim 1, wherein said concatenation of said series of said temporally-successive linear pixel arrays along said temporal dimension comprises concatenating said linear pixel arrays from every Nth successive image frame in said series of image frames.

7. The computer implemented method of claim 1, further comprising defining one or more lines of analysis by a user for parallely constructing multiple spatio-temporal analysis images.

8. The computer implemented method of claim 1, wherein said segmentation of said constructed spatio-temporal analysis image comprises foreground segmentation for detecting objects and said events of interest, said foreground segmentation comprising:
    modeling a background of said constructed spatio-temporal analysis image;

subtracting said modeled background from said constructed spatio-temporal analysis image for obtaining a foreground of said constructed spatio-temporal analysis image; and performing segmentation of said obtained foreground for detecting said objects and said events of interest.

9. The computer implemented method of claim 1, wherein said capture of said events of interest at said line of analysis comprises detecting presence of an object, detecting traversal of said object, determining speed of said traversal of said object, determining an object count based on said traversal of one or more objects, and determining duration of said presence of said object.

10. The computer implemented method of claim 9, wherein said determination of said speed of said traversal of said object comprises:
receiving one or more lines of analysis spaced apart from each other by a separation distance on said image frames from a user, wherein said separation distance is based on an actual distance in an actual scene;
constructing one or more spatio-temporal analysis images based on said one or more lines of analysis;
determining presence and times of said presence of said object on said constructed one or more spatio-temporal analysis images using foreground segmentation; and
determining said speed of said traversal of said object based on said separation distance, frame rate of said video, and difference between times of said presence of said object on said constructed one or more spatio-temporal analysis images.

11. A computer implemented system for capturing events of interest by performing a spatio-temporal analysis of a video, comprising:
a moving image capture device that acquires a continuous video stream containing a series of image frames over time, wherein each of said image frames is represented by horizontal spatial coordinates and vertical spatial coordinates of a two dimensional plane;
a video content analyzer provided on a computing device for performing:
assigning a temporal dimension across said image frames of said video stream, wherein said temporal dimension represents order of said image frames using predefined temporal coordinates; and
constructing a spatio-temporal analysis image based on a user-defined line of analysis on each of one or more of said image frames, wherein said spatio-temporal analysis image is constructed by concatenating a series of temporally-successive linear pixel arrays along said temporal dimension, each of said linear pixel arrays comprising an array of pixels underlying said line of analysis defined on said each of said one or more of said image frames; and
an image segmentation module provided on said computing device for segmenting said constructed spatio-temporal analysis image for capturing said events of interest.

12. The computer implemented system of claim 11, further comprising a user interface on said computing device for defining said line of analysis along one or more of said horizontal spatial coordinates, said vertical spatial coordinates and a combination of said horizontal spatial coordinates and said vertical spatial coordinates in one or more of said image frames.

13. The computer implemented system of claim 12, wherein said user interface enables a user to define one or more lines of analysis for parallely constructing multiple spatio-temporal analysis images.

14. The computer implemented system of claim 11, wherein said constructed spatio-temporal analysis image is represented by one of a combination of a fixed horizontal spatial coordinate, a range of said vertical spatial coordinates, and variable temporal coordinates and a combination of a fixed vertical spatial coordinate, a range of horizontal spatial coordinates, and variable temporal coordinates.

15. The computer implemented system of claim 11, wherein said constructed spatio-temporal analysis image provides a summary of events occurring over said image frames at said line of analysis for one of a duration of said video and a duration of said concatenation of said series of said temporally-successive linear pixel arrays.

16. The computer implemented system of claim 11, wherein a width of each of said linear pixel arrays is substantially identical to a width of said line of analysis, wherein said width of said line of analysis is at least a single pixel.

17. The computer implemented system of claim 11, wherein said image segmentation module performs foreground segmentation of said constructed spatio-temporal analysis image for detecting objects and said events of interest, said image segmentation module comprising:
a background modeler for modeling a background of said constructed spatio-temporal analysis image;
a background subtractor for subtracting said modeled background from said constructed spatio-temporal analysis image for obtaining a foreground of said constructed spatio-temporal analysis image; and
a foreground segmentation module for performing segmentation of said obtained foreground for detecting said objects and said events of interest.

18. The computer implemented system of claim 11, wherein said captured events of interest at said line of analysis comprises presence of an object, traversal of said object, speed of said traversal of said object, an object count based on said traversal of one or more objects, and duration of said presence of an object.

19. A computer program product comprising computer executable instructions embodied in a non-transitory computer readable storage medium, wherein said computer program product comprises:
a first computer parsable program code for acquiring a continuous video stream containing a series of image frames over time, wherein each of said image frames is represented by horizontal spatial coordinates and vertical spatial coordinates of a two dimensional plane;
a second computer parsable program code for assigning a temporal dimension across said image frames of said video stream, wherein said temporal dimension represents order of said image frames using predefined temporal coordinates;
a third computer parsable program code for constructing a spatio-temporal analysis image based on a user-defined line of analysis on each of one or more of said image frames, wherein said spatio-temporal analysis image is constructed by concatenating a series of temporally-successive linear pixel arrays along said temporal dimension, each of said linear pixel arrays comprising an array of pixels along said line of analysis defined on each of one or more of said image frames; and
a fourth computer parsable program code for segmenting said spatio-temporal analysis image for capturing said events of interest.

20. The computer program product of claim 19, wherein said fourth computer parsable program code for segmenting said spatio-temporal analysis image comprises:
- a fifth computer parsable program code for modeling a background of said constructed spatio-temporal analysis image;
- a sixth computer parsable program code for subtracting said modeled background from said constructed spatio-temporal analysis image for obtaining a foreground of said constructed spatio-temporal analysis image; and
- a seventh computer parsable program code for performing segmentation of said obtained foreground for detecting said objects and said events of interest.

* * * * *